United States Patent [19]
Yoshino

[11] 3,822,606
[45] July 9, 1974

[54] ELASTIC BAR-SHAPED RACK
[75] Inventor: Miyao Yoshino, Tokyo, Japan
[73] Assignee: Kabushikigaisha Nittsu Sogokenkyusho, Tokyo, Japan
[22] Filed: Dec. 29, 1972
[21] Appl. No.: 319,650

[30] Foreign Application Priority Data
  Feb. 1, 1972  Japan.............................. 47-11008

[52] U.S. Cl. ................................................ 74/422
[51] Int. Cl. ............................................ F16h 1/04
[58] Field of Search ...................................... 74/422

[56] References Cited
UNITED STATES PATENTS
3,572,153  3/1971  Dove................................... 74/422
3,636,791  1/1972  Barr..................................... 74/422

*Primary Examiner*—Leonard H. Gerin
*Attorney, Agent, or Firm*—Holman & Stern

[57] ABSTRACT

A bar-shaped flexible rack for slidable linear motion under the action of a rotatable pinion within a curved guide, the rack being provided with rack teeth set at a fixed spacing on a spindle a plurality of elasticity, which spindle has a predetermined elasticity.

5 Claims, 7 Drawing Figures

ELASTIC BAR-SHAPED RACK

BACKGROUND OF THE INVENTION

This invention relates to a bar-flexible rack having an elasticity so as to be freely curved in any part.

A rack gear can be applied to any mechanism by being combined with a pinion and performs an important role as a machine element.

For example, by meshing a pinion with a reciprocating rack gear, linear motion can be converted to rotary motion or vice versa.

However, a conventional rack gear having such an important function cannot perform curved motion.

SUMMARY OF THE INVENTION

Accordingly the present invention has as an object the provision of a rack rack teeth formed on a spindle having an elasticity so that the rack may be freely curved or may slide within a curved guide frame.

BRIEF DESCRIPTION OF THE DRAWINGS

An embodiment of the present invention will be explained with reference to the drawings in which.

DETAILED DESCRIPTION OF THE PREFERRED EMBODIMENTS

Figure 1:
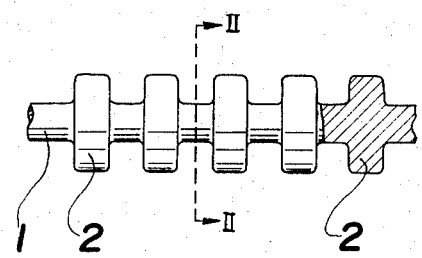
FIG. 1 is an elevation of an embodiment of the present invention.
Figure 2:
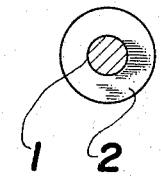
FIG. 2 is a side view vertically sectioned on II—II in FIG. 1.

In FIGS. 1 and 2, 1 is a long columnar spindle formed of a synthetic resin material having suitable elasticity and 2 is a circular flange-shaped rack tooth spatially provided on the spindle.

Figure 3:
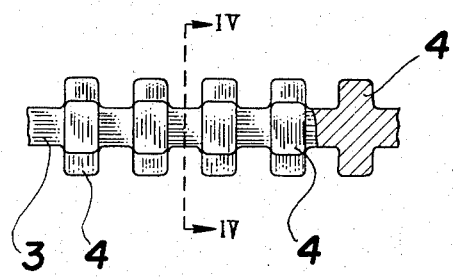
FIG. 3 is an elevation showing another embodiment.
Figure 4:
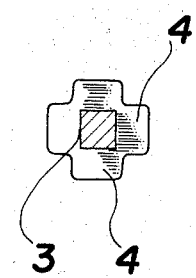
FIG. 4 is a side view vertically sectioned on IV-IV in FIG. 3.

It is also possible to provide several rack teeth 4 on each side of a square-sectioned pillar-shaped spindle 3 as shown in FIGS. 3 and 4.

Such rack teeth are integrally formed by injection-molding and can be properly continuously jointed according to the required application.

If a large operating force is present in use, the spindle 1 or 3 having piano wire as the core material is formed in advance and rack teeth 2 or 4 are injection molded on the spindle.

Figure 5:
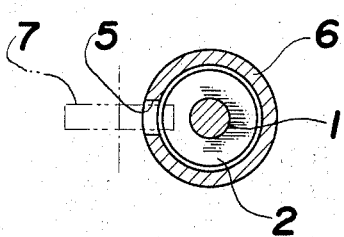
FIGS. 5 and 6 are vertically sectioned side views showing a rack of the invention inserted through a guide.
Figure 6:
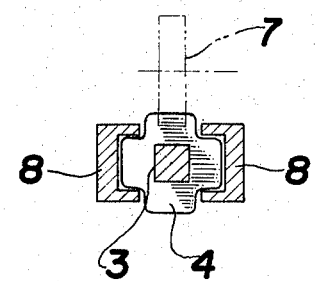

An example of an application of the invention is explained in the following. As shown in FIG. 5 the rack teeth 2 are slidably inserted through a cylindrical guide 6 having a cut groove 5 on one side and a pinion 7 is suitably meshed with the cut groove 5 or as shown in FIG. 6 the rack teeth 4 are slidably inserted through a rectangular guide 8 and are projected in one or two parts from the rectangular guide 8 and the pinion 7 is suitably meshed with such projected part.

Figure 7:
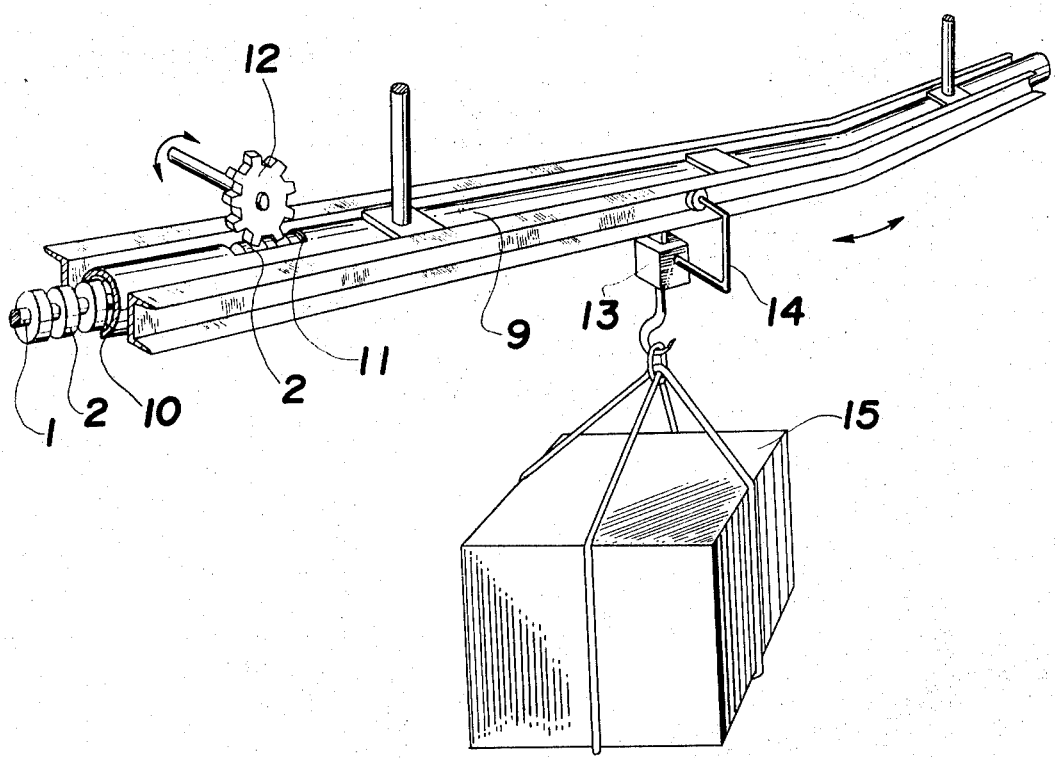
FIG. 7 is an explanatory view of a rack of the invention as employed in a conveying line.

If the guide 6 or 8 is suitably curved, the spindly 1 or 3 will curve accordingly. At this time, if the guide is made to slide, the spindle will snake. Further, for example, as shown in FIG. 7, in order to utilize the present invention in a conveying line, a cut line groove 10 is provided in a curved guide 9 assembled in the form of a circuit, a cut opening 11 is formed in a part on the other surface of the guide 9 and a pinion 12 rotated, for example, by a motor (not illustrated) is meshed with the rack so that the rack may be moved at a fixed velocity in the rotating direction through the rack teeth 2.

Hence, if an engaging device 13 suitably engaged with the rack teeth 2 in the cut line groove 10 is provided and a conveying frame 14 slidably hung on the curved guide 9 is formed, the conveying frame 14 will convey an article 15 at the same velocity as the advancing velocity of the rack teeth 2 to any position in the conveying line.

In short, in the present invention, since several rack teeth 2 or 4 are set at a fixed spacing on a spindle 1 or 3 having suitable elasticity, then if they are slidably inserted in a guide provided with a suitable opening, a pinion will be able to be rotated and driven or an engaging device engaged with the rack will be able to be conveyed when the rack is slidably pushed or pulled and even a curved guide will be able to be easily followed. Thus a rack having wide application is provided according to the present invention.

Further, when it is slidably employed as a means of conveying an engaged article, the article is easily engaged and disengaged. Whereas conventional means are only capable of either pulling or pushing the rack, the present invention has an excellent advantage in that the rack can be moved in two directions as mentioned above.

What is claimed is:

1. A rack for slidable linear motion by a rotating pinion, along a guide having straight and curved portions which rack comprises:

a flexible spindle having a predetermined modulus of elasticity;

a plurality of resilient rack-teeth peripherally disposed in mutually fixed spaced relationship along the spindle for engagement with the pinion when the rack is in the guide, whereby during said slidable linear motion the rack flexibly adapts to both the curved and straight portions of the guide thus ensuring continuous unimpeded progress of the rack therethrough.

2. A device as claimed in claim 1 where said spindle is circular in cross section and said resilient rack-teeth have the shape of circular flanges mounted on the outer surface of the spindle.

3. A device as claimed in claim 1 where said spindle is square in cross section and each one of said teeth consist of a square shaped projection disposed on each side of said square shaped spindle, the pinion being rotatably engagable with a specific one of said projections on each of said teeth of the spindle for linear motion of the rack within the guide.

4. A device as claimed in claim 2 wherein said spindle is formed of synthetic resin.

5. A device as claimed in claim 3 wherein said spindle is formed of synthetic resin.

* * * * *